United States Patent [19]

Walker et al.

[11] 4,040,576
[45] Aug. 9, 1977

[54] RETRACTOR LOCK AND PAWL SADDLE THEREFOR

[75] Inventors: Ronald Jay Walker, Sterling Heights; Dewayne James Sherwin, Imlay City; Robert John Rumpf, Grosse Pointe, all of Mich.

[73] Assignee: The Firestone Tire & Rubber Company, Akron, Ohio

[21] Appl. No.: 639,472

[22] Filed: Dec. 10, 1975

[51] Int. Cl.² ........................ A62B 35/00; B65H 75/48
[52] U.S. Cl. ............................. 242/107.4 A; 74/577 R
[58] Field of Search ................. 242/107.4 R–107.4 E, 242/107.6, 107.7; 74/577 R, 577 S, 577 SF, 577 M; 188/82.7, 82.74, 82.77; 297/388; 280/744–747

[56] References Cited

U.S. PATENT DOCUMENTS

| | | | |
|---|---|---|---|
| 3,695,545 | 10/1972 | Peters | 242/107.4 A |
| 3,858,826 | 1/1975 | Sprecher | 242/107.4 D X |
| 3,945,587 | 3/1976 | Willey | 242/107.4 A |
| 3,948,460 | 4/1976 | Kondziola | 242/107.4 A |

*Primary Examiner*—Stanley N. Gilreath
*Assistant Examiner*—John M. Jillions
*Attorney, Agent, or Firm*—Miller, Morriss and Pappas

[57] ABSTRACT

A retractor lock and pawl saddle combination for seat belt retractors and particularly inertial retractors in which the saddle supports the pawl or lock and the saddle is deformably installed in the retractor frame dimensionally supporting and journalling the shaft of the retractor drum and having a deflective portion in support of the pawl so that as the pawl engages the ratchet wheel, a portion of the saddle flexes guidably and the pawl is carried to thrust and lock abutment against the retractor frame. The flexing portion of the saddle supports an inertial sensor such as a pendulum and the pendulum upon movement pivots the pawl to engage the ratchet wheel. The saddle pawl and sensor are preassembled and are then sprung into place between the upstanding walls of the retractor frame.

5 Claims, 4 Drawing Figures

RETRACTOR LOCK AND PAWL SADDLE THEREFOR

The present invention is a new and improved flexing pawl saddle for seat belt retractors in which the flexing portion, under lock stress, allows the pawl element to displace as well as to rotate and to thereby engage the web portion of the retractor frame in stress carrying abutment. The displacement, of course, is limited. The saddle is oriented by providing journal bushings for the winding drum shaft and is fixedly located by projections that registrably impinge with the frame to provide high dimensional control.

Seat belt retractors have been extensively used in automotive and aircraft environments and such retractors increasingly are of the vehicle sensitive type in which inertial imbalance of the vehicle (as by braking) is sensed and in this manner the retractor drum containing the webbing is locked against further webbing withdrawal until the vehicle is restored to normal operating range. For the most part, such sensors comprise a pendulum and the pendulum, on displacement, acts directly or indirectly on lock means which causes the drum to be disabled, locked or blocked from further webbing withdrawal. Frequently the lock means is a pawl which is tilted or moved to lockably engage ratchet teeth on a ratchet wheel. Upon engagement, the pawl receives the blocking thrust and transmits the thrust by way of its pivotal relation in the retractor frame to the frame. Thus, the pawl pivot and the journal area surrounding the pawl pivot at the frame interphase is critical and subject to wear and abrasion and may result in ultimate misalignment and difficulty. In such arrangements the location of the pawl is dimensionally dependent upon the pivot opening which is lanced, punched, or otherwise provided in the metal retractor frame. In addition, the spacing between the pawl tooth and the ratchet teeth has always been dimensionally critical and a variety of saddle supports have attempted to reduce the tolerance stack so that a more constant dimensional relationship is maintained as between pendulum and pawl and between pawl and retractor.

However, in the prior art the saddles are designed so that the pawl pivots still act at openings in the walls of the retractor frame. In the present invention, the tolerance stack is further reduced by suspending the saddle structure from the shaft of the retractor drum. Then the pawl is movable and the pivotal relationship to the frame is eliminated since the pivot in the saddle moves with the pawl. Hence dimension reference is established at the drum axis. The invention is then extended to pivotal support of the pawl by the saddle independent of pivotal openings in the frame. Finally, the present invention allows the controlled movement of the pawl under stress to engage the retractor frame at selected locations thereby materially allowing for the strengthening and increasing of the thrust carrying area of pawl to frame interphase. Then, when the thrust is relieved, the pawl is restored to its disengaged and poised position.

This deflection is accomplished using a resin saddle structure in which the resin is dimensionally stable, rugged, selectively deformable and repetitiously accurate as by injection molding or casting at low cost and high volume. Further, the deformable characteristics enhance ease of assembly, reduce weight, and integrates structure with resultant size reduction.

Hence, the objects of the new saddle structure are to provide a pawl saddle for controlled flexure in pivotal support of the pawl and with a suspension from the index position of the retractor drum shaft with improved buttress of pawl against the frame web and in concurrent support of the inertial sensor. Further, these objects are achieved in a simple expedient at lower cost without sacrifice of accuracy and with increased effectiveness. Other objects will be appreciated by those skilled in the art as the description proceeds.

The state of the art is reasonably represented by U.S. Pat. Nos. 3,838,831 to Lon E. Bell; and 3,873,041 to Robert J. Rumpf, et al, directed to saddles generally and by U.S. Pat. No. 3,945,587 to Ronald A. Willey, et al. The present invention is distinguishable therefrom and represents a non-obvious extension of the art in the safety belt retractor field.

GENERAL DESCRIPTION

In general, the pawl supporting saddle of the present invention is a one-piece molded resin structure which is indexed and suspended from the shaft of the retractor drum in drum type retractors. As thus suspended, the cylindrical axially registering extensions form bearing insert supports extending through the channel shaped retractor frame. This dimensionally fixes one portion of the saddle at the ends of the arms of the saddle. The web or transverse saddle portion between the arms will be seen as movable since the arms are, in fact, bifurcated and the web is connected to the movable portion of the bifurcations. The immovable portion of the bifurcations includes pin-like extensions transverse of the arms which engage mating openings or index structure in the retractor frame. Since the resin forming the saddle structure is deformable and resilient the bifurcation of the arm provides an integral hinge action allowing the movable bifurcations to shift under stress. The movable bifurcations also include pivotal openings and these openings support a pawl element. In a general way, the pawl element thus bridges across the space between the arms at a line above the web portion of the saddle and is pivotal on the axis established between the two movable bifurcations. Hence the pawl moves or floats with the movable of the saddle arms. The extent of the movability of the pawl supporting bifurcations is limited by engagement with the retractor frame such as the heel of the pawl against the buttress formed by the back-up surface of the web of the channel shaped retractor frame. Hence, as the pawl is tilted to engage the ratchet teeth of the ratchet wheels of the drum, a stress is immediately transmitted by the moving ratchet wheel to the pawl and the pawl applies the stresses to the pawl pivots and the movable bifurcation flexes in respect to the fixed bifurcation until the pawl heel strikes the rigid abutment of the retractor frame. Where the geometry of the frame and saddle will not allow the web to absorb the lock thrust, it will be appreciated that metal abutments can be provided by indenting metal from the sides of the frame to provide a thrust buttress against which the pawl is engageable upon movement. The desired lock surface area is extended over the prior art where stresses were absorbed at the pawl pivot. The retractor frame web is upset as by lanced stops so that the pawl upon impact with the frame web cannot slip or displace under impact stress. In use with vehicle sensitive inertial retractors, the present saddle structure is most amenable to the support of an actuator or sensor of the pendulum type. The pendulum support or actuator is attached to the web of the saddle intermediate the movable bifurcations and the pendulum web includes a circular knife edge in support of the pendulum cap. Normally the pendulum depends in a vertical position. Upon sensing inertial imbalance as by braking or sudden stops or impact from any direction, the pendulum changes position and the cap of the pendulum rises on the knife edge support thereby displacing the pawl sufficiently to engage the pawl tips with the ratchet wheels. Thereupon deformation occurs in the saddle and the pawl checks any further withdrawal of webbing by jamming against the back-up of the web portion of the retractor frame. All impact stresses are thus transmitted into a high strength large area portion of the retractor frame and the stresses are thereby absorbed or transmitted into the vehicular fastening and vehicle structure.

In operation the dimensional accuracy of the molded saddle is greatly improved by reason of the indexing and locations of the saddle structure in the frame suspended from the drum shaft. The high precision molding results in substantial reduction in the tolerance stack. The structure is easily assembled in retractor structures and preassembly of pawl and pendulum is easily accommodated. The natural resiliency in the selected resin assures return of the saddle with no permanent deformation while materially improving the stress carrying capabilities of any particular retractor structure and vastly simplifying assembly and manufacture.

IN THE DRAWINGS

SPECIFIC DESCRIPTION

Figures 1, 2:
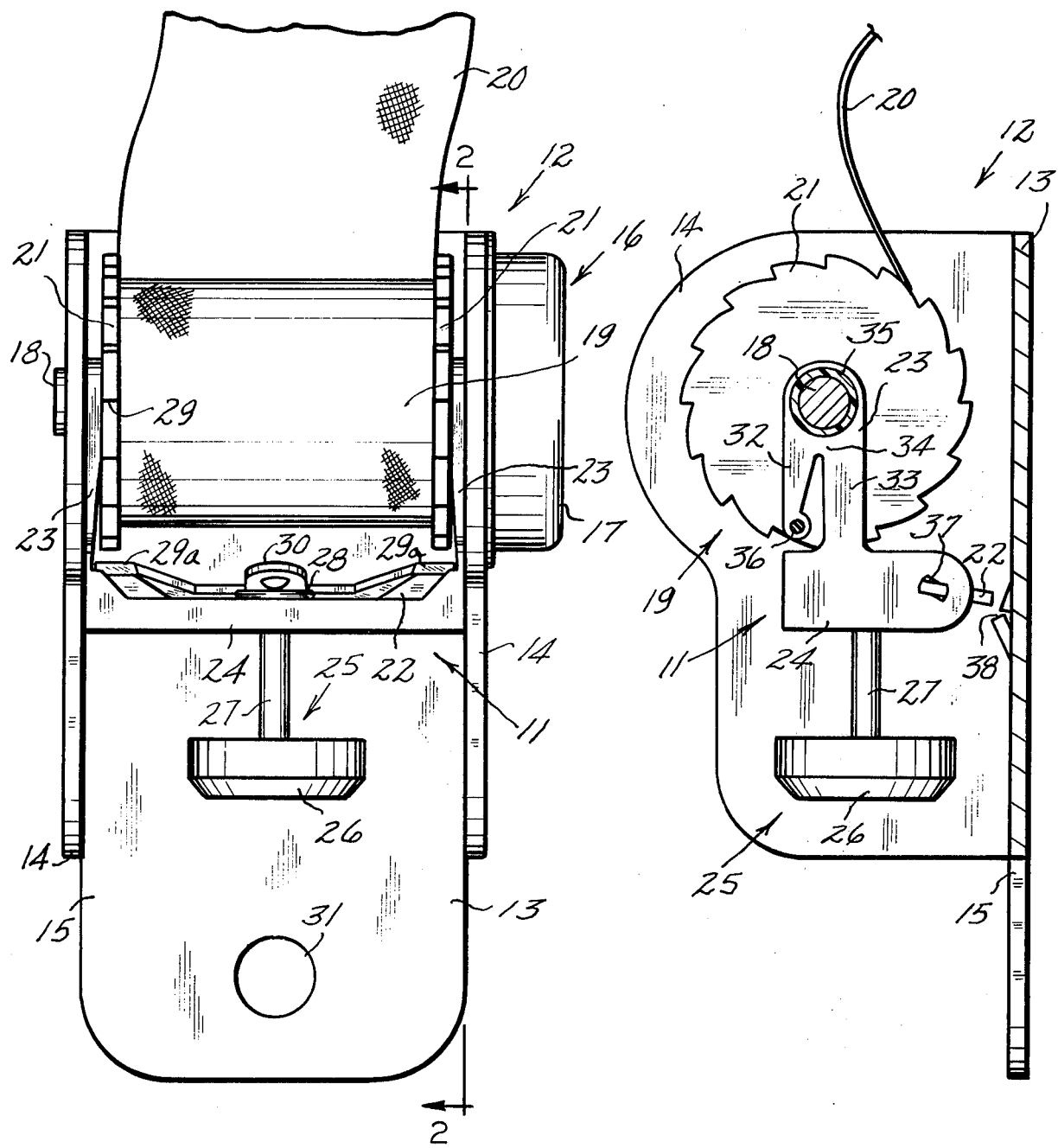
FIG. 1 is an elevation view of a rectractor in which the present invention is embodied and the pendulum depends vertically.
FIG. 2 is a full cross section view taken on the line 2—2 of FIG. 1 and illustrating the side of the saddle element and the support arms being bifurcated.

Referring to the drawings and with first particularity to the FIG. 1 thereof, the saddle structure 11 of the present invention is seen installed in a typical seat belt retractor structure 12 of the drum type. The retractor structure 12 comprises a channel shaped retractor frame 13 having upstanding legs 14 in parallel spaced-apart relation and connected on the back side by the web portion 15. The frame 13 supports a flat spring motor 16 housed beneath the cover 17 and which is drivably connected to the shaft 18 of the retractor structure 12 and the shaft 18 is connected operably to the storage drum or reel 19 upon which is wound seat belt webbing 20. The retractor structure 12 thus comprises a webbing storage receptacle biased by the spring motor 16 to gather in slack belt and to wind it thereon. The seat belt webbing is selectively withdrawn from the drum 19 against the rewind bias of the motor 16 and in the retractor 12 illustrated the ratchet wheels 21 which form the end flanges of the drum 19 are lockable against rotation when the pawl element 22 is tilted to engage the teeth of the ratchet wheels 21. The pawl element 22 is tiltably supported in the arms 23 of the saddle structure 11. As will be seen, limited movement of the pawl 22 is permitted since the pivotal support of the pawl 22 is by a stress movable portion of the arms 23. The pawl 22 movement is limited by selected impact with some portion of the frame 13 in interference position with movement of the pawl 22 between the walls or legs 14 of the frame 13. Also a part of the saddle 11 is a saddle web portion 24 which supports sensing mechanism as, for example, the pendulum element 25. As shown in FIG. 1 the pendulum comprises a depending mass 26, a stem 27 and a tab or head 28 connected to the upper end of the stem 27. The stem 27 may be constructed for disconnection from the head 28 or mass 26 for assembly, disassembly or adjustment as by a thread, not shown. In some installations the pendulum 25 may be integrally formed and assembly is then achieved by deformation of the saddle web 24 at the pendulum seat or by a bayonet slot allowing the head dimension to penetrate and move laterally at a stem dimension and then to a circular knife edge seat of a dimension less than the outside diameter of the head 28. Thus, the head 28 is positioned beneath the pawl element 22 and inertial displacement of the pendulum 25 causes the head 28 to rise and tilt the pawl 22 so that the tips 29a of the pawl engage the teeth 29 of the ratchet wheels 21. While a pair of ratchet wheels 21 are shown, one or more ratchet wheels 21 are operative in achieving, with the pawl 22, adequate lockup against the withdrawl of seat belt webbing 20 from the drum 19. The pad extension 30 of the pawl 22 provides a lever-like following engagement with the top or head 28 of the pendulum 25 and in some instances a light spring bias urges such contact and may thereby provide a sensitivity adjustment for vehicle sensitive retractors 12. The opening 31 through the retractor frame web 15 provides a means for attachment of the retractor 12 in a vehicle, as for example, on a door post, frame, or other structural anchor point, as desired.

Figure 3:
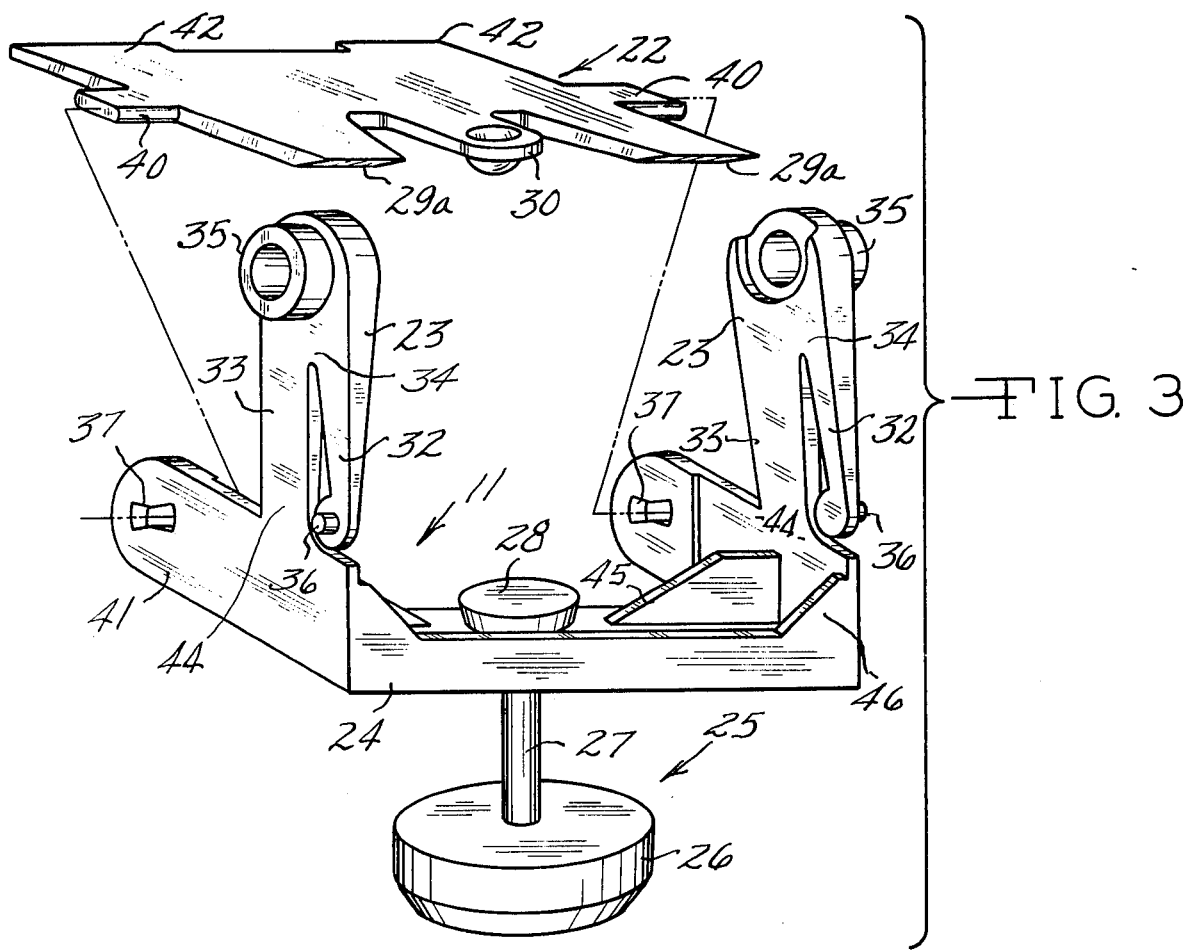
FIG. 3 is an exploded perspective view of the saddle structure of the present invention and illustrating the simplicity of construction and the ease of assembly and preassembly.

In FIG. 3, the construction of the saddle structure 11 is best understood since the arms 23 are there appreciated as integral and bifurcated, being connected at region 34. One bifurcation 32 is fixed. The other bifurcation 33 is resiliently supported by the fixed bifurcation 32 and is movable to the extent that the design permits. The bifurcations 32, while fixed at the shaft 18 and at the pin 36 in the wall 14 bow slightly under stress and evidences slight torsional displacement at the pin 36 indicating that the stress of movement in the bifurcation 33 is integrally absorbed in the fixed bifurcation 32. The upper ends of the arms 23 include axially aligned cylindrical extensions 35 which serve as journal bushings between shaft 18 and retractor frame 13. The integral pin 36 or extension projects from the fixed bifurcation 32 and into a registering cavity or opening in the walls 14 of the frame 13 and thereby secures the bifurcation 32 in fixed relation in cooperation with the shaft attachment of the sleeves or cylinders 35. In addition, the pivotal support of the pawl 22 is appreciated as resting in the butterfly or pivotal opening 37 in the movable bifurcation 33. The movable bifurcation 33 is also seen as in direct support of the saddle web 24. The lanced guide stop 38 is also visible in the FIG. 2 projecting upwardly to provide a slip preventing dimple in the floor or web 15 of the retractor frame 13. As will be seen, the stop 38 prevents slippage or overrun of the pawl contact with the frame 13. An internally projected thrust buttress may be projected inwardly from the stock of the legs or walls 14 of the frame 13 in interference with the movement of the pawl 22. However, maximum thrust surface is provided using floor or web 15 of the frame 13.

In FIG. 3, the pawl supporting saddle structure 11 is better illustrated as relates to an explanation of the simplicity of preassembly of pendulum 26 and pawl 22 in support relation by the saddle 11. In addition, the deformable character of the resin saddle 11 shows how the inserts or sleeves 35 are capable of assembly on the shafting 18 (previously shown) and interconnected with the frame 13 (previously shown) and how the fixed bifurcation 32 is fixed by reason of the grasp at the shaft 18 by the cylindrical extensions 35 and by the impingement of the pin-like extensions into stop means in the frame 13. The pawl 22 is easily inserted into the butterfly openings 37 and the pivot extensions 40 are dimensioned so as not to extend beyond the outside dimension of the wings 41 in the saddle web 24. Thus, the saddle structure 11 nests between the walls or legs 14 and in easy slide assembly relation between the upstanding walls 14 in the frame 13. The combination of rectangular pivot extensions 40 in the butterfly slots 37 results in an effective knife edge pivotal support of the pawl 22. The pressure tab 30 of the pawl 22 extends into contact registry with the head 28 of the pendulum 26 upon assembly. Where desired the tab 30 may extend as shown by dimpling or by bending. The heels 42 of the pawl 22 are as extensive as the stress distribution sought. The movable bifurcations 33 in the arms 23 are also dimensionally reduced as they join the saddle web 24 and this region 44 of increased deformability enhances ease of assembly. Saddle reinforcements such as 45 and 46 increase the stability of the saddle web 24 where deformation is not desired after assembly. These are, of course, matters of design and not invention, but are important in extending operability and stability.

Figure 4:
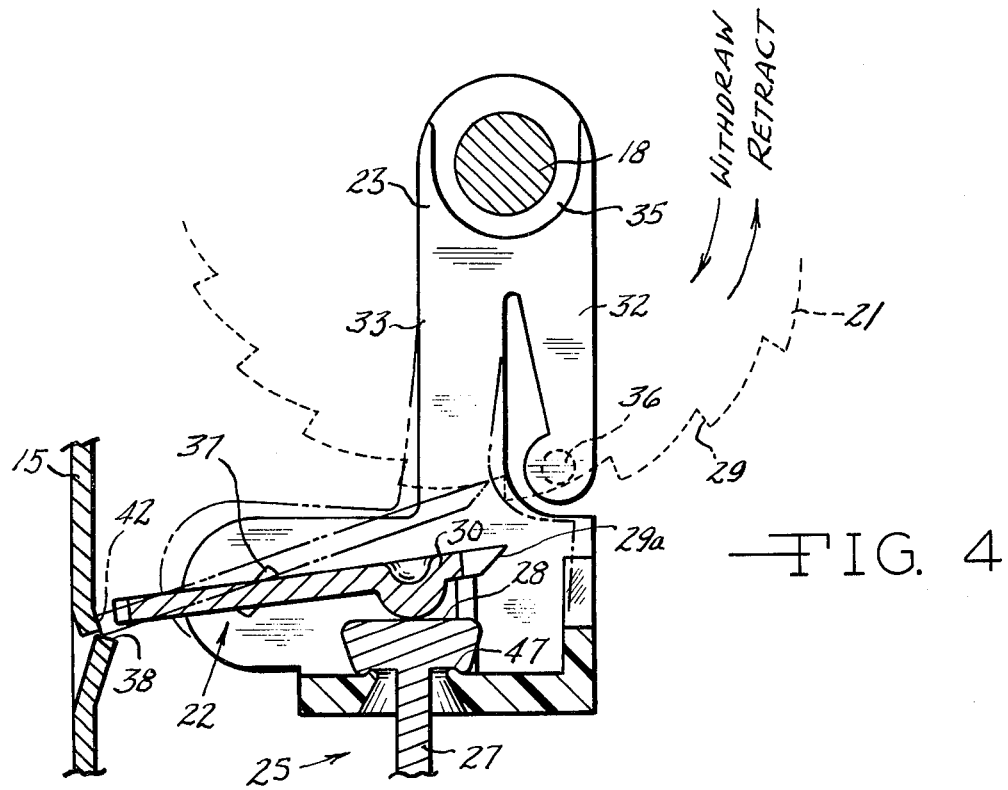
FIG. 4 is a fragmental side elevation view and showing the flexing function of the saddle structure of the present invention when the pawl becomes engaged with the ratchet wheel of the drum and is carried to lock position against the buttress in the retractor frame web.

By reference to FIG. 4 the operation of the described inventive structure is best understood. The ratchet wheel 21 is shown in phantom line and when seat belt webbing is withdrawn from the drum 19 (FIG. 1) the ratchet wheel 21 rotates in a clockwise direction as shown and each of the teeth 29 present a locking target for the pawl 22. The pawl 22 is pivotal in the pivots provided in the movable bifurcations 33 as by interaction between pawl pivot extensions 40 and the butterfly openings 37. Such pivoting does not occur until the pendulum 26 is inertially influenced. Then, the head 28 of the pendulum rises on the circular knife edge seat 47 and this motion elevates the head 28 by tilting and this causes the pawl 22 to be tilted upwardly as seen in FIG. 4 to interference engagement as between the ratchet teeth 29 and the pawl tips 29a. Since the seat belt webbing 20 is under tension and moving toward withdrawal the stress is directly transmitted from tooth 29 to pawl 22 and the limited deformation of the movable bifurcations 33 occur until the heel 42 of the pawl 22 engages the stop obstruction 38 provided (as shown) in the floor or web 15 or at buttresses projecting into the path of the pawl 22. Then all stresses flow through the pawl 22 and into the web retractor frame 13 as at the web portion 15. No stress beyond the light deforming stress is felt by the saddle structure 11 and the total stress of lock-up or impact is transmitted into the selected strongest buttress portion of the retractor frame 13. The phantom line in the FIG. 4 indicates the relative displacement of the bifurcations 33 in the arms 23. As retraction occurs or a restoration of normalcy then rotation in a counterclockwise retracting direction occurs and the pawl 22 is restored by gravity or spring force as desired to the ready position on the head of the pendulum 26 or other sensing mechanism.

The preferred resin forming the injection molded precision medium is "Delrin", an acetal resin manufactured and sold under the indicated trademark of E. I. DuPont de Nemours & Co. It will be understood that resins such as Nylon and Teflon may be used provided that they have equivalent or better properties than the acetal resin presently preferred.

The present invention has resulted in a substantially improved pawl support saddle for seat belt retractors and particularly in vehicle sensitive inertial retractors. Assembly has been simplified, tolerances have come under closer control and the handling of impact stresses has been materially improved. The form of the saddle structure is easily refashioned to suit particular frame installations and with attendant economies and accuracy consequent to mass molding procedures.

Having thus described the invention, those skilled in the art will see improvements, changes and modifications adapting these to a variety of retractors and controls and such improvements, changes and modifications are intended to be included herein, limited only by the scope of the hereinafter appended claims.

We claim:

1. A retractor lock and pawl saddle structure for seat belt retractors comprising:
   a saddle made from a resin plastic having bifurcated arms to form a first arm portion and a second arm portion pivotal relative to said first arm portion;
   a pawl element pivotally supported solely by said saddle in the second arm portion;
   a retractor drum for selected retraction and withdrawal of seat belt webbing therefrom;
   a ratchet wheel rotatable with said drum and secured against withdrawal rotation when said pawl is engaged thereagainst;
   a shaft about which said drum and said wheel rotates; and
   a channel shaped frame, the upstanding legs of said frame in support of said shaft, a stop buttress on said frame, and means on said frame and said first arm portion for fixing said first arm portion relative to said frame, whereby upon said pawl locking against said ratchet wheel said second arm portion pivots relative to said first arm portion bringing said pawl into engagement with said stop buttress.

2. A retractor pawl saddle made from a resin plastic and a lock pawl for seat belt retractors comprising:
   a pair of axially aligned cylindrical resin plastic bushings;
   a pair of arms extending outwardly from each of said bushings in a plane perpendicular to the axis through said bushings and integral therewith;
   at least one in each of said pairs of arms having an integral retaining pin for fixing said arms with said pins against movement and each of the other of said arms in each of said pairs of arms being flexurally movable in said plane in respect to said fixed arms;
   a pivot opening through both of said movable arms;
   a pawl pivotally supported between said movable of said arms in said pivot openings and said pawl movable with said movable arms; and
   a weakened membrane between said fixed arms and said movable arms whereby said movable arms are resiliently displaceable in said plane in respect to said fixed arms.

3. A pawl saddle for drum type seat belt retractors comprising:

a one-piece U shaped resin plastic frame element having upstanding leg portions and a web portion extending between said upstanding leg portions and said leg portions including axially registering openings therethrough at the upper ends thereof and said leg portions each being bifurcated to form two extensions, one extension of each leg portion including pin-like protuberances for fixing the position of said one extension relative to the retractor frame and the other extension of each leg portion being movable relative to each said one extension in a plane perpendicular to the axis of said openings, said web portion being supported on each side by each of said other extensions;

a pawl element pivotal on said resin plastic frame on the web connected movable extensions; and a pawl actuator supported by said web portion of said frame in operative engagement with said pawl.

4. A seat belt retractor structure in which a channel shaped body supports a retractor drum biased toward retraction and having one or more ratchet wheels movable with said drum and said drum being supported by a shaft through said retractor body, the combination comprising:

a one-piece deformable resin plastic saddle nestable between the legs in said channel body and suspended from said shaft, said saddle having a web portion and bifurcated arms, one of the bifurcations in each arm being pinned to said retractor body and the other bifurcation in each arm being pivotal relative to the pinned bifurcation in a plane perpendicular to the axis of said shaft and having pivot supports;

a pawl pivotally supported by said bifurcations at said pivot supports;

a pendulum through said web portion and supported thereby and said pendulum operably engaging said pawl whereby movement of said pendulum from the vertical causes displacement of said pawl and engagement of said pawl with said ratchet wheels and continuing stress against said pawl shifts the position of said pawl by deformation of said bifurcations having pivot supports and moving to buttress engagement of said pawl against said retractor body.

5. In a drum type retractor for seat belts having a drum on which belting is wound and biased toward retraction and in which said drum is supported on a shaft through a channel shaped retractor body and said drum includes at last one ratchet wheel moving with said drum, the combination comprising:

a channel shaped one-piece deformable resin plastic saddle element having a pair of bifurcated upstanding legs, one of said bifurcations in each leg being fixed to said retractor body and one of said bifurcations in each leg being flexurally movable in respect to said retractor body, and a web portion intermediate said legs, the web portion connected to the movable bifurcations and the immovable bifurcations being pinned to said retractor body and said legs having aligned cylindrical journal extensions from said legs in support of the shaft of said drum and supported by said retractor body;

a flat pawl tiltably supported solely by the movable bifurcations of said saddle element and, upon tilting, engageable with said ratchet wheel;

a pendulum supported in the web portion of said saddle element beneath said pawl and engaged operably with said pawl in selected displacement thereof and upon such displacement said pawl engages the ratchet wheel and the movable bifurcations of said saddle are thereupon deflected and said pawl moves with said movable bifurcations to buttress lock against said retractor body locking said retractor against withdrawal of webbing therefrom; and a stop in the retractor frame preventing slippage or overrun of said pawl.

* * * * *

UNITED STATES PATENT OFFICE
CERTIFICATE OF CORRECTION

Patent No. 4,040,576  Dated 1977 August 9

Inventor(s) Ronald Jay Walker, Dewayne James Sherwin and Robert John Rumpf

It is certified that error appears in the above-identified patent and that said Letters Patent are hereby corrected as shown below:

Column 3, line 33, "rectractor" should read --- retractor ---

Column 8, line 13, "last" should read --- least ---

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*